United States Patent
Fawley

(10) Patent No.: US 6,519,909 B1
(45) Date of Patent: Feb. 18, 2003

(54) COMPOSITE REINFORCEMENT FOR SUPPORT COLUMNS

(76) Inventor: Norman C. Fawley, 5701 Seaside Walk, Long Beach, CA (US) 90803

(*) Notice: Subject to any disclaimer, the term of this patent is extended or adjusted under 35 U.S.C. 154(b) by 0 days.

(21) Appl. No.: 08/205,502

(22) Filed: Mar. 4, 1994

(51) Int. Cl.⁷ .............................. E04C 3/34; E04C 23/00
(52) U.S. Cl. .................. 52/721.4; 52/737.4; 52/745.18; 156/71
(58) Field of Search .................. 52/745.18, 745.17, 52/746.1, 738.1, 721.4, 721.5, 723.1, 723.2, 723.5, 736.3, 736.4, 737.4, 737.5; 264/31, 35, 257, 258; 156/71, 94, 98

(56) References Cited

U.S. PATENT DOCUMENTS

| | | |
|---|---|---|
| 3,340,115 A | 9/1967 | Rubenstein |
| 3,370,998 A | 2/1968 | Wiswell |
| 3,429,758 A | 2/1969 | Young |
| 4,019,301 A | 4/1977 | Fox |
| 4,255,071 A | 3/1981 | Koppers et al. |
| 4,559,974 A | 12/1985 | Fawley |
| 4,589,562 A | 5/1986 | Fawley |
| 4,676,276 A | 6/1987 | Fawley |
| 4,700,752 A | 10/1987 | Fawley |
| 4,786,341 A | 11/1988 | Kobatake et al. |
| 4,918,883 A * | 4/1990 | Owen et al. ............... 52/736.4 |
| 5,027,575 A * | 7/1991 | Owen et al. ............... 52/741.3 |
| 5,043,033 A | 8/1991 | Fyfe |
| 5,175,973 A | 1/1993 | Owen et al. |
| 5,194,110 A | 3/1993 | Fawley |
| 5,218,810 A | 6/1993 | Isley, Jr. |
| 5,245,813 A | 9/1993 | Brotz |
| 5,289,942 A | 3/1994 | Fawley |
| 5,326,410 A | 7/1994 | Boyles |

OTHER PUBLICATIONS

"Fiber Composite Plates Can Strengthen Beams", H. Saadatmanesh, et al. Concrete International, Mar. 1990, pp. 65–71.

* cited by examiner

Primary Examiner—Michael Safavi
(74) Attorney, Agent, or Firm—Venable; John P. Shannon

(57) ABSTRACT

A process for reinforcing a load supporting structure including placing a first layer of at least one distinct pre-cured composite piece around the structure, applying adhesive between the piece and the structure, exerting pressure until the adhesive cures, wherein the piece is performed with a shape complementary to the structure, placing at least one additional layer of at least one distinct pre-cured composite piece around the structure and the first layer, and applying an adhesive between the layers.

26 Claims, 6 Drawing Sheets

COMPOSITE REINFORCEMENT FOR SUPPORT COLUMNS

BACKGROUND OF THE INVENTION

The present invention relates to support columns, such as concrete support columns for bridges, and, more particularly, to reinforcement of such columns with a composite material.

Support columns, such as bridge supports and supports in parking structures, can occasionally experience forces beyond the forces for which they were designed. This has happened a number of times during earthquakes. The results have been catastrophic, with the collapse of bridges and other structures, loss of life and the loss of use of major highways for many months, and even years. The cost of rebuilding collapsed structures like bridges is so high that sometimes the structures are not rebuilt.

Concrete bridge columns are typically 4 to 8 feet in diameter and 20 to 60 feet high. In an earthquake, the ground shifts not only laterally, but vertically. The lateral shift causes a failure at the column base or in the mid-column because of the inertia of the upper bridge structure being at rest while the lower structure shifts laterally. In the case of the 1994 San Fernando Valley earthquake, the ground also moved up from a thrust fault, which caused the columns to fail in the middle versus the lower sections, where they failed in the 1989 Loma Prieta earthquake.

Pre-1971 bridge columns in California had a sufficient amount of vertical steel, but only had circular reinforcing lap splice bars approximately every 12". In the 1971 Sylmar earthquake, the 1989 Loma Prieta earthquake, and the 1994 San Fernando Valley earthquake, many of these columns exploded because of the forces, either from the ground moving up in the earthquake, or from the inertia of the bridge deck collapsing down. This caused the columns to explode radially outward in a pear-shaped fashion. More-recently constructed columns have a complete cirumferential reinforcement cage defined by circumferential reinforcing bars spaced approximately on one-inch centers, rather than on the previously used one-foot centers.

Some concrete bridge columns which were already reinforced with embedded steel reinforcing bars have been retrofitted with steel jackets. The steel jackets typically have a thickness between ⅜" to 1 inch, depending upon a variety of conditions, including soil conditions, the original design of the column, the height of the column, the amount of load the column carries, etc. In order to retrofit existing columns with additional reinforcement, steel jackets made of semi-cylindrical sections are placed around the outside of the columns, and the sections and jackets are welded together to form adequate confinement. A drawback with the steel jackets is that they must fit as tightly as possible, even though the concrete columns are not always precise in diameter. In order to accomplish this, the columns are individually measured and those measurements are used to fabricate steel jackets of approximately the same diameter. The semi-cylindrical jacket sections are slightly oversized, for example ⅛" to ¼" oversized in radius. After the jackets are welded in place, they are pumped with an epoxy grout to serve as a medium to transfer from the concrete column to the steel jacket the loads imposed on the column. Sometimes a concrete slurry is injected between the steel jacket and the column, because of the difficulty in fitting the jacket to the column. However, there is shrinkage with the injected concrete and, therefore, there is inadequate load transfer between the column and the jacket. Furthermore, the steel jackets are very heavy and cumbersome to install, even with the aid of power cranes. Moreover, skilled workers, e.g., welders, are required to install the steel jackets, and the jackets are subject to corrosion and require maintenance. Space between the steel jackets and the concrete column is pumped with a pressuring grout to maintain adequate load transfer from the column to the jackets. However, because the column may often be coated with a significant amount of residue and because the steel jacket may have rust on it, the bond between the two load transfer surfaces is often insignificant.

The use of a resin pre-impregnated semi-cured material using carbon fibers or glass fibers or KEVLAR fibers and the use of a wet lay-up system involving high strength fibers and wet resin are currently being pursued. In the wrapping of columns with pre-impregnated tape, an entire machine must be brought to the job site. The use of the machine to wrap the columns can be very difficult in confining situations where the columns are placed very near walls.

Other support columns, which are commonly made of wood, such as utility poles, wharf pilings and bridge supports, occasionally experience exceptional forces, such as in winds or earthquakes. They also suffer from general wear and tear. Furthermore, many wooden utility poles treated with creosote experience dry rot in their lower portions.

SUMMARY OF THE INVENTION

By the present invention, apparatus is provided which reinforces support columns to withstand exceptional loads, without having the drawbacks of previously known devices.

A column reinforcement device is provided which is easy to install in the field with unskilled labor. The column reinforcement device can be installed without heavy machinery or heavy tools. The column reinforcement device is premeasured to be the correct diameter, length and thickness for the column. The preformed nature of the device permits it to be precisely premeasured as to width, length and diameter for the particular column on which it is to be used. The appropriate dimensions can be determined as a result of testing in a laboratory. The elimination of the need for calculating, measuring or cutting in the field permits the composite column reinforcement to be installed by an unskilled worker and in severe weather conditions.

The column reinforcement comprises preformed, pre-cured composite members to reinforce the column against failure in earthquakes and other extraordinary events. The device comprises a large plurality of bidirectional continuous, lightweight, high strength, electrically non-conductive nonmetallic fibers extending parallel to one another, and a resinous material encapsulating the fibers.

Because of the uniformity and diameter of bridge column height, the composite column reinforcement members of the present invention are well suited to high volume manufacture and ease of installation in the field with semi-skilled labor.

By the present invention, apparatus is provided which reinforces support columns to withstand exceptional loads, without having the drawbacks of previously known devices.

Concrete is brittle. It has limited ductility.

The composite column reinforcement members according to the present invention greatly increase ductility and confinement for concrete columns. The composite column reinforcement members confine the concrete and prevent the outward expansion or spalling of concrete. If the outward expansion or spalling can be prevented, then the column will be adequate to support the bridge load, even if the concrete is pulverized by the compressive forces from an earthquake.

Because the structural columns are subject to side-to-side loads, not only vertical acceleration and compression, longitudinal fibers are in the reinforcement members to provide an adequate side-to-side load reinforcement.

By encapsulating the concrete columns with the composite reinforcing members, there is nowhere for the concrete to go if the concrete shears or compresses and turns in fact to rubble, because its outer circumference is contained. Consequently, the column and the structure it supports remain intact. In contrast, in an unconfined structure, the acceleration of the column caused by the forces of the earthquake cause the column to either be crushed or to be sheared and the outer portions of concrete to spall off. With this spalling off of concrete, the diameter of column is reduced, its ability to support an upper structure is decreased, and the column fails, along with the upper structure. The composite reinforcing members are intended to be used with concrete columns containing steel reinforcing bars, as well as with columns which do not contain reinforcing bars.

The composite column reinforcement devices can take the form of coil bands having a plurality of concentric elastic convolutions, or jackets defining almost complete cylinders except for a small, axially extending gap.

The composite reinforcement members of the present invention are fixed to concrete columns by a high-elongation adhesive, such as a urethane adhesive, which has an affinity for both the composite and the concrete.

Based on the use of 1,000 psi adhesive, a 61' diameter column with a 5' high jacket would have about 13 million pounds of shear strength, thereby making the jacket integral with the concrete column.

The composite column reinforcement members are light enough to be very easily handled by two installers. A 6' diameter composite reinforcement jacket, 5' high, and 1/8" thick weighs approximately 125 pounds. The composite reinforcement members are made relatively thin e.g., so that, if additional reinforcement is required at the base of the column, the middle or the top of the column, additional reinforcement members can simply be placed over the outside of previously applied members, thereby making the system as "application friendly" and adaptable as possible in the field.

Also, because of the physical flexibility of the composite material, reinforcement members in the form of jackets, or sleeves, can be stacked one inside another, possibly stacking as many as ten jackets in this manner for easy transport with minimal space requirements. With their resilience, the jackets return to their original shape when unpacked at the jobsite.

Because the composite jackets are produced in a factory under controlled conditions, the densities of the filaments and resin is very precise, and the mechanical properties are very uniform, especially compared to filament and resin systems which are laid up wet in the field. The dimensions can be checked, the fiber reinforcement content can be measured through resin burnoff or other laboratory tests, and, therefore, a high degree of uniformity can be obtained.

The skill level required of installers is significantly lower than for steel jackets, which must be welded in place. Basic laborers can apply the composite column reinforcement members of the present invention on freeways, bridges or other structures.

By reinforcing a concrete column with the composite reinforcing members of the present invention, the deformation and the ductility of the column are significantly increased. The present invention confines the concrete from spalling off and increases the ductility of the column during bending by the use of a very simple hand-applied system.

The composite reinforcing jackets rely on the strength of the filaments and their bidirectionality, in that the longitudinal fibers support the column from bending or shearing sideways, while the circumferential fibers support the column from failing in a radial or circumferential direction.

DETAILED DESCRIPTION OF THE PREFERRED EMBODIMENTS

Figure 1:
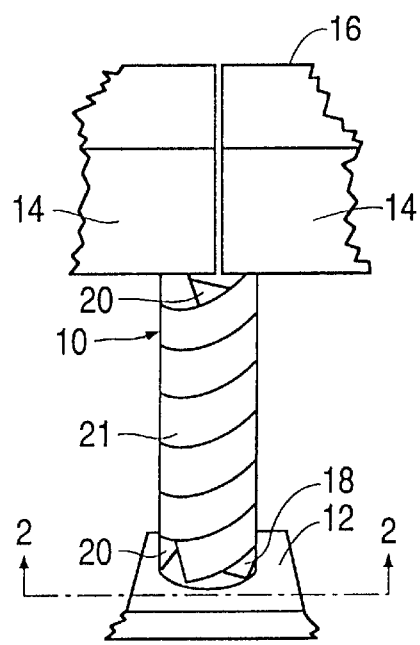
FIG. 1 is a perspective view of a reinforced support column according to the present invention supporting a highway overpass.

As can be seen from FIG. 1, a composite reinforced support column according to the present invention, which is designated generally by the reference numeral 10, is shown rising from a base 12 to support sections 14 of a highway overpass 16. As can be appreciated from FIGS. 1 and 2, in this embodiment, the composite reinforcement is in the form of bands 18–21 wrapped spirally, or helically, around a primary load-bearing member 22, such as a concrete column. Such composite reinforcement bands 18–21 are wrapped, one over the other, with the end of each band spaced around the perimeter of the primary load-bearing member 22 from the ends of the other bands. The ends are normally spaced equally so that, for example, where four bands are applied, one over the other, the ends of the bands are spaced by 90° around the perimeter of the primary load-bearing member 22, as can be seen from FIGS. 1 and 2. Furthermore, the direction of the helix of alternate bands is reversed. Thus, the band 21 of FIG. 1 is wound counterclockwise, the adjacent underlying band 20 is wound clockwise, and so on, such that a herringbone pattern is present.

Figure 2:
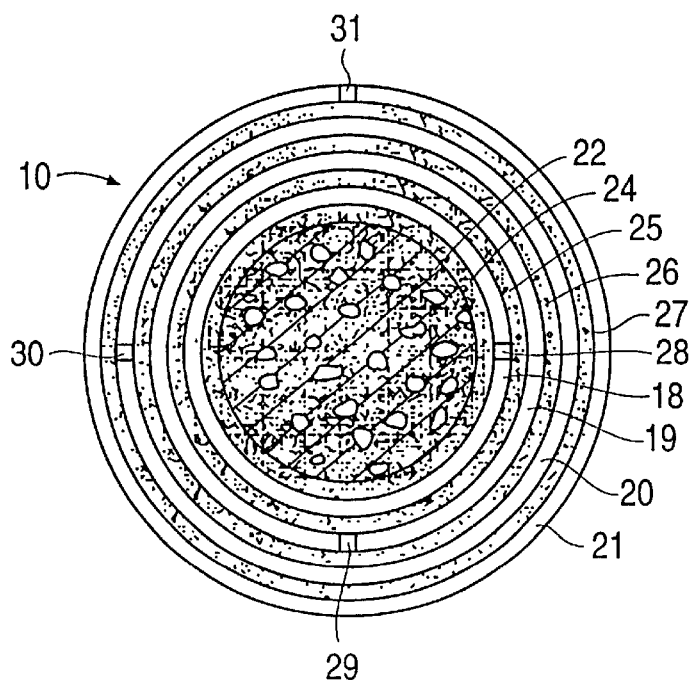
FIG. 2 is cross section of the reinforced column taken along the line 2—2 in FIG. 1.

The first composite reinforcement band 18 is held fixed to the column 22 by a layer of adhesive 24 extending over the entire inner surface of the band. Subsequent reinforcement bands 19–21 are wrapped around and fixed to underlying bands by additional layers of adhesive 25–27 extending over the entire inner surfaces of the bands. Although the layers of adhesive 24–27 may be different in thickness from the thickness of the composite reinforcement bands 18–21, they are shown in FIG. 2 as having the same thickness as the reinforcement bands for clarity of illustration. The reference numerals 28–31 indicate the lower ends of the bands 18–21, respectively.

The adhesive is either a single or plural component adhesive system, which can be mixed in static mixers and pumped from drums. The adhesive can be an expanding, moisture-activated adhesive, so that the adhesive is not activated until water is applied to it by, for example, spraying the water. Catalyst is mixed with the sprayed water and, by changing the relative amounts of catalyst and water, the curing time of the adhesive can be changed. Based on the resin-catalyst ratio of the adhesive, the cure time, or work time, can be changed dramatically. As an example, with a pre-heated urethane adhesive system, the work time can be approximately 25–30 seconds with a low catalyzed plural component system, or as much as 2 hours. The cure time on these adhesive systems at ambient temperature is approximately 4–5 hours. Both one-component and two-component adhesives are suitable for fixing the composite reinforcing members to the primary load-bearing members. Suitable one-component systems are available under the designations 22005 and 22009, and suitable two-component adhesives are available under the designations 2U056 and 2U057, all from Swift Adhesives of Downers Grove, Ill.

Figure 3:
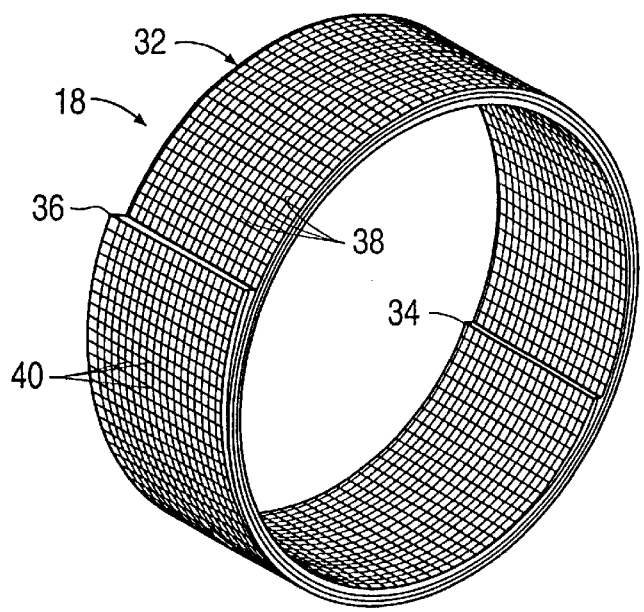
FIG. 3 is a perspective view of a first embodiment of a composite reinforcement member according the present invention.

FIG. 3 shows a composite reinforcement band 18 prior to its wrapping around a column. The reinforcement band 18 comprises a coiled web 32 of composite material having a rectangular transverse cross section and a plurality of concentric elastic convolutions including an innermost convolution having an inner end 34, an outermost convolution having an outer end 36, and intermediate convolutions. The composite material includes a large plurality of bidirectional, lightweight, high tensile strength, electrically non-conductive nonmetallic filaments or fibers 38 and 40 extending parallel to one another in the web 32, the fibers being encapsulated in a completely cured resin matrix. Each fiber 38 extends the entire length of the web 32, and each fiber 40 extends across the entire width of the web, at, for example, 90° to the fibers 38. Although the parallel fibers 38, 40 are generally indicated in FIG. 3, by parallel lines 38 and 40, each space between adjacent parallel lines actually represents hundreds or thousands of fibers, each having, in the case of glass fibers, a diameter of less than 0.001 inch (0.0025 centimeter).

The resin matrix is applied to the fibers 38, 40 during manufacturing and prior to curing. With the resin in place and fully cured, the composite material is impervious to corrosion and most fluids and, thereby, protects the fibers 38, 40 and the portion of the column 22 underlying the reinforcement band 18 from deterioration. Glass is a suitable material for the fibers 38, 40, and especially E-type glass fibers because they are relatively inexpensive. However, other fibers, such as fibers made of KEVLAR, carbon or polyester can also be used. Suitable resins are resilient when cured and, when they are cured in a coiled spiral configuration, they will return to the same configuration after being uncoiled, once the uncoiling force is removed.

Figure 4:
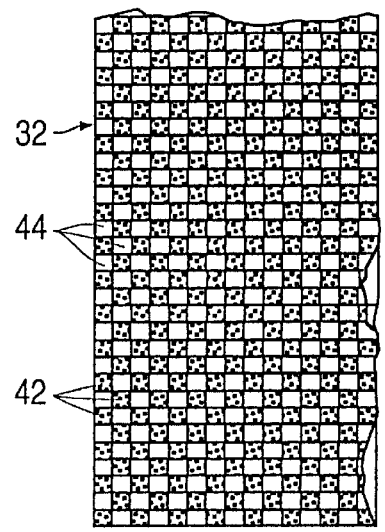
FIG. 4 is a schematic view of a tape of bidirectional fibers used in making the composite reinforcement member of FIG. 3.

As can be seen from FIG. 4, the web 32 can comprise bundles, or rovings, of the fibers 38 and 40 in which rovings 42 of the transverse fibers 40 extend alternately over and then under adjacent rovings 44 of the fibers 38 as the fibers 40 extend from one side of the web to the other, thereby defining a woven material made of the fibers. As an alternative, the rovings of the fibers 38 and 40 are not woven, but instead the longitudinal fibers 40 lie generally in one or more first planes, and the transverse fibers 38 lie generally in one or more adjacent second planes. Stitching can be used with the unwoven alternative to hold the fibers 38 and 40 in rovings and to hold the fibers 38 in a 90° or other predetermined orientation relative to the fibers 40. Depending on the forces involved in the structure to be reinforced, the fibers in the web 32 can be tri-directional rather than bidirectional. Thus, rather than having some fibers 38 extend in one direction and other fibers 40 extend at 90° to the fibers 38, the fibers can extend in three different directions. For example, a first group of fibers can extend in a first direction, with a second group of fibers extending in a second direction at a 60° angle to the first direction and a third group of fibers extending in a third direction oriented at 60° angles with respect to both the first and second directions.

As can be seen from FIGS. 1 and 2, the preformed coil reinforcement band 18 is put on in a helical fashion up the column 22 and then the bands 19, 20 and 21 are put on in the same manner, each band comprising an additional layer of reinforcement. The number and/or thickness of the bands employed depends upon the size of the column and the strength requirements. Where four reinforcement bands are used, the start position of the second and subsequent bands 19–21 is indexed by 90° around the circumference of the column 22 relative to the subjacent band. The adhesive bonds the first reinforcing band 18 to the concrete column 22 and each overlying reinforcement band 19–21 to the adjacent underlying band. The adhesive can be applied by various techniques, such as with a spray gun. The preformed coil bands 18–21 can be applied using two man-lifts, positioned on opposite sides of the column 22. The installers start at the base of the column 22, applying the coil reinforcement band 22 by wrapping it up around the column in a helix. Once they reach the top of the column 22, the installers return to the bottom of the column and apply another layer, using another coil reinforcement band. An adhesive is used that cures anywhere in the range of from about 40° to about 100° Fahrenheit.

Figure 5:
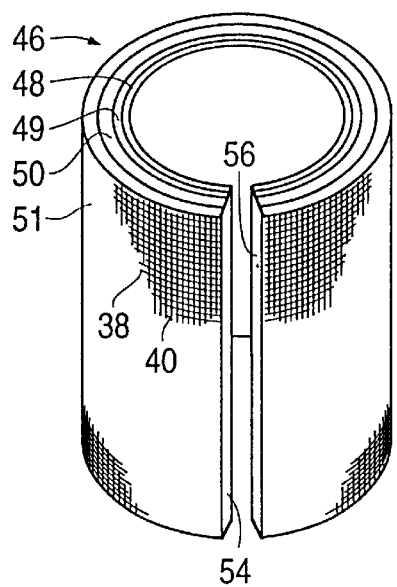
FIG. 5 is a perspective view of an assembly of composite reinforcing members of a second embodiment according to the present invention as fabricated.

As can be seen from FIG. 5, in an alternate embodiment, the reinforcement devices according to the present invention can be in the form of sleeves or jackets which are placed around a primary load-bearing member, such as the concrete column 22, and fixed in place by the adhesive. FIG. 5 shows an assembly 46 comprising a plurality of composite reinforcement jackets 48–51. Each of the jackets 48–51 comprises the composite reinforcement material described in connection with the embodiment of FIGS. 1–3, including the longitudinal fibers 38, the transverse fibers 40 and the completely cured resin matrix. A layer of a conventional release film 39 (FIGS. 6 and 7) is interposed between adjacent jackets to facilitate the separation of the jackets 48–51 from one another. The innermost jacket 48 is formed to have an inner diameter substantially equal to the outer diameter of the column 22 to be reinforced. The innermost jacket 48 has an outer diameter which is substantially equal to the inner diameter of the jacket 49. Similarly, the jacket 49 has an outer diameter substantially equal to the inner diameter of the jacket 50, and the jacket 50 has an outer diameter substantially equal to the inner diameter of the jacket 51. Although the assembly 46 of FIG. 5 contains four concentric jackets, other numbers of jackets can be included in an assembly, depending on the size and weight of the jackets, and the ease with which they can be handled.

A typical width for a web of the fibers 38 and 40, or height or axial dimension for the jackets 48–51, is 5 feet, and a typical thickness for each jacket is ⅛ inch. Furthermore, it is contemplated that jackets of one-half the axial dimension of the primary jackets 48–51, that is, 2.5 feet, will also be employed, as will be described hereinafter. The jackets 48–51 extend most of the way, that is, about 358°, around the circumference of the column 22, and a gap exists between the circumferential ends 54 and 56 of the jackets. As a result of the gap, the jackets 48–51 can be expanded to extend around the column 22 or other primary load-bearing member. Due to their resilience, the jackets 48–51 return to their original sizes and configurations around the column 22 after the expanding force has been removed. Due to the presence of a release film 39 between adjacent jackets, the jackets 48–51 can be peeled away from one another easily. The composite reinforcing jackets 48–51 are lightweight, especially when compared to steel jackets, and the sizing of the jackets 48–51 to nest within one another saves considerable space when the jackets are being transported to a job site. As with the embodiment of FIGS. 1–3, where the forces in the application warrant, the fibers in the webs of material in the jackets 48–51 can be tridirectional instead of bidirectional.

Figure 6:
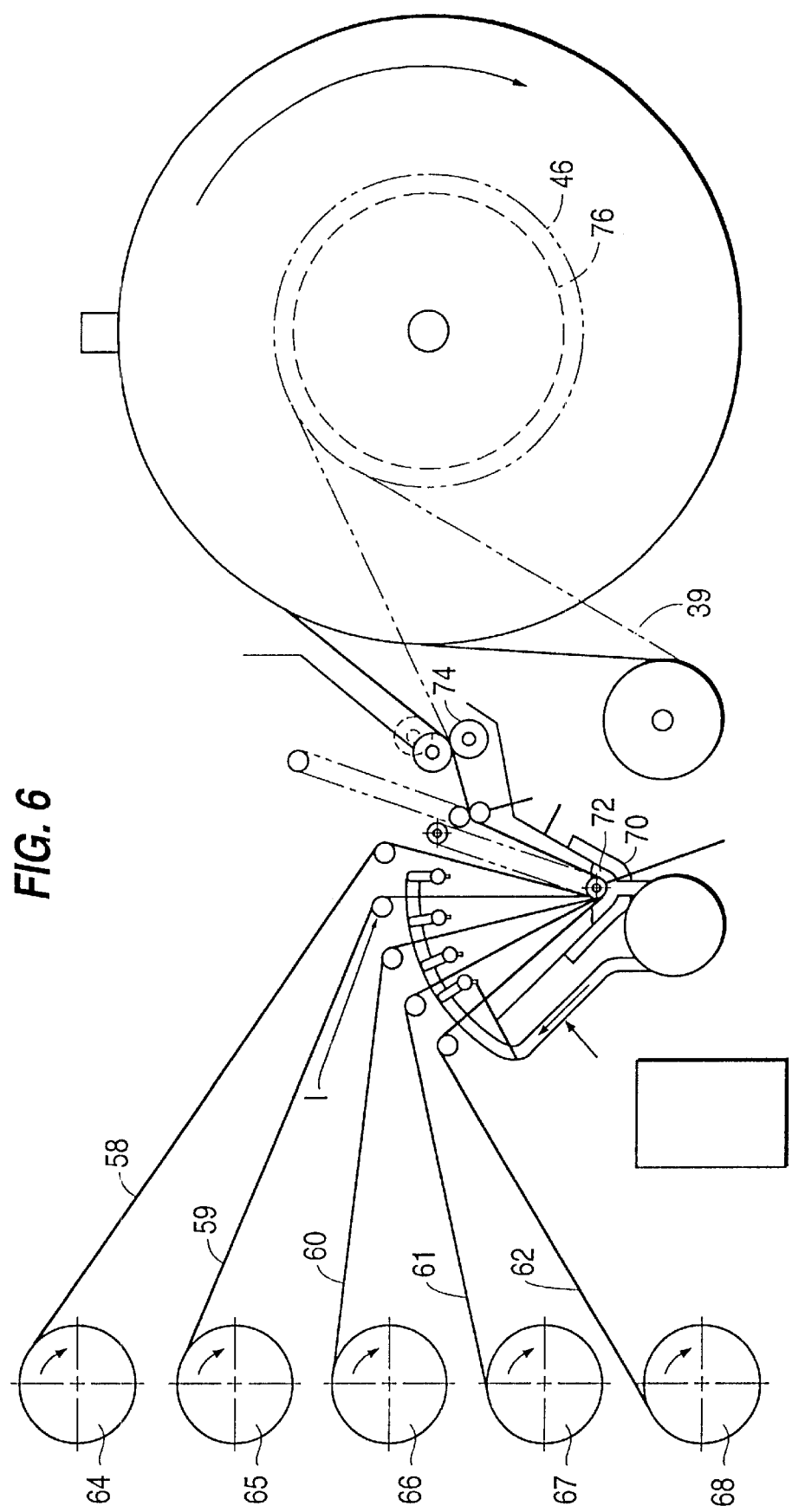
FIG. 6 is a schematic view of a process for making the assembly of composite reinforcement members of FIG. 5.
Figure 7:
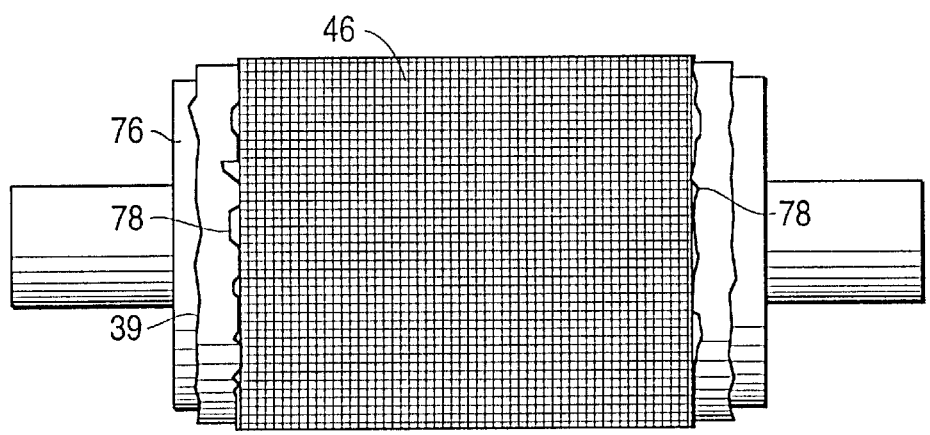
FIG. 7 is a view of the assembly of composite reinforcement members, in an unfinished condition, made by the process of FIG. 6.

As can be seen from FIGS. 6 and 7, the assembly 46 of jackets 48–51 can be made by bringing together and saturating a series of thin webs 58–62 of filaments, such as a preformed tapes of woven fibers, for example, by feeding the webs from spools 64–68, respectively, and through a bath 70 of resin 72, squeegeeing off the excess resin with rollers 74 to define a wet impregnated strip of composite material, and winding the saturated filaments around a rotating mandrel 76 in a plurality of convolutions to define a spiral band. The mandrel 76 has an outer diameter selected to correspond to the desired minimum inner diameter of the spiral, depending on the job application. Then, the resin is completely cured, thereby establishing an elastic set in the convolutions. In order that the resin-saturated fibers on the mandrel 76 remain in discrete layers, the release film 39 of MYLAR or other suitable material is applied to the outer surface of the resin-saturated fibers, for example, from a spool 80 while the fibers are being wound around the mandrel. A similar release film or release coating is applied to the mandrel 80 itself so that the assembly 46 of jackets can be removed. The curing is accomplished under the normal curing conditions for the resin used. For example, for one suitable polyester isophthalic resin, an appropriate MEK peroxide catalyst can be added to the resin in the bath and then the device can be post-cured at a heat of 140° F. (60° C.) for about 2 hours.

The thin webs 58–62 are brought together to form a complete web 82 of desired thickness. The thin webs 58–62, when dry, comprise layers in the complete web, but when the complete web 82 is saturated with resin, a unitary strip of composite material is formed. One of the thin webs can be made, for example, entirely of longitudinally oriented fibers, another thin web can be primarily transverse fibers, another thin web can be woven with 50% of the fibers longitudinal and 50% of the fibers transverse, etc. A wide variety of fiber arrangements in the thin webs is contemplated, the important consideration being that the complete web has the desired amounts of fibers oriented in the desired directions. In a typical complete web, 70% of the fibers are longitudinal and will be oriented circumferentially around the column, and 30% of the fibers are transverse and will be vertical on a vertical column. The thin webs 58–62 have a width substantially equal to the axial height of the jackets 48–51 to be formed. Each convolution of the complete web on the mandrel 76 produces one reinforcing jacket. When the desired number of convolutions is achieved, the complete web is cut at the mandrel. When the resin has cured, the spiral wound web on the mandrel 76 is cut down to the mandrel in the longitudinal direction, thereby producing the assembly 46 of jackets 48–51, with the cut forming the gaps between the ends of the jackets, and a layer of the release film 39 between each two jackets to facilitate the separation of the jackets from one another at the job site. The assembly 46 is removed in one piece from the mandrel, and the jackets 48–51 are individually marked so that they can be installed on a support column in the correct order and size sequence.

As can be seen from FIG. 7, the interleaving release film 39 is wider than the web of fibers to prevent the resin from running around the edges and connecting with the resin of other layers. Prior to curing, some resin may run out onto the margins of the release film 39 and constitute regions of flash 78 after curing. The flash 78 is trimmed off.

In both the embodiment of FIGS. 1–3 and the embodiment of FIGS. 5–9, the filaments 38 and 40 comprise on the order of .50% to 60% by weight of the composite reinforcing member, with the cured resin matrix comprising the rest. In addition, the relative amounts of the fibers 38 extending in the longitudinal direction, which will be circumferential on the column, and the fibers 40 extending in the transverse direction, which will be vertical on a vertical column, can be adjusted according to the forces to be encountered in the primary load-bearing members to be reinforced by the composite reinforcement devices according to the present invention. For example, in one application, 50% of the fibers can be fibers 38 extending in the longitudinal direction and 50% can be fibers 40 extending in the transverse direction. In another application, 90% of the fibers can be fibers 38 extending in the longitudinal direction and 10% of the fibers can be fibers 40 extending in the transverse direction. Of course, many other relative amounts of fibers are possible. Suitable resins for the matrix include vinyl ester resins and isophthalic polyester resins. A suitable vinyl ester resin is available under the designation Atlac 409 and a suitable isophthalic polyester resin is available under the designation 33434, both from Reichhold Chemical Company of Chicago, Ill. The jackets 48–51 are, for example, approximately 5' in height and equal to the diameter of the column. Concrete columns commonly have diameters of 3, 4, 5, 6 and 8 feet. The urethane adhesive systems which can be used with the present invention develop a shear strength of between 1,000 psi and 2,000 psi. At 1,000 psi, it is calculated that there is 13,376,400 lbs. of adhesive strength to prevent any shearing between a 6 foot diameter concrete column and a 5 foot high jacket.

During installation, adhesive is applied to a column and/or to jackets like the jackets 48–51, and the jackets are spread apart at their gaps and placed around the column. As can be seen from FIG. 9, in order to prevent a gap from creating a weakness in the overall reinforcement, a second jacket 80 is placed around a first jacket 82, with the gap 83 of the second jacket positioned 180° around a column 84 from the gap 85 of the first jacket. If the forces involved require third and even fourth layers of reinforcement, a third jacket 86 can be placed around the second jacket 80, with its gap 88 positioned 90° around the circumference of the column 84 from the gap 85 of the first jacket. The gap 90 of a fourth jacket 92 is positioned 180° around the circumference of the column 84 from the gap 88 of the third jacket 86. A layer 94 of adhesive is interposed between each jacket, as well as between the first jacket, as well as between the first jacket 82 and the column 84.

Figure 8:
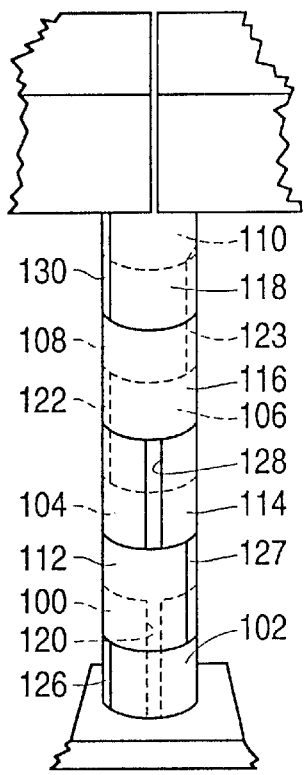
FIG. 8 is a perspective view of a reinforced support column according to the present invention, using a plurality of the reinforcement members of FIG. 5 to support a highway overpass.
Figure 9:
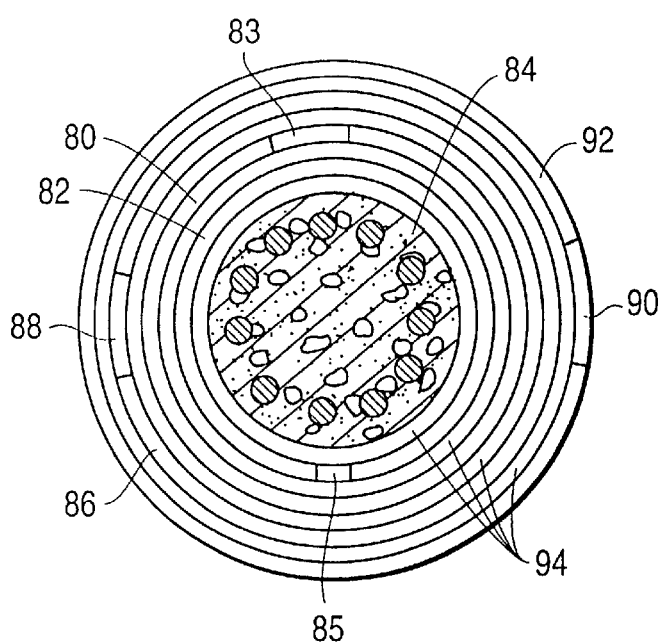
FIG. 9 is a cross section taken through a support column reinforced with a plurality of the reinforcement members of FIG. 5.
Figure 10:
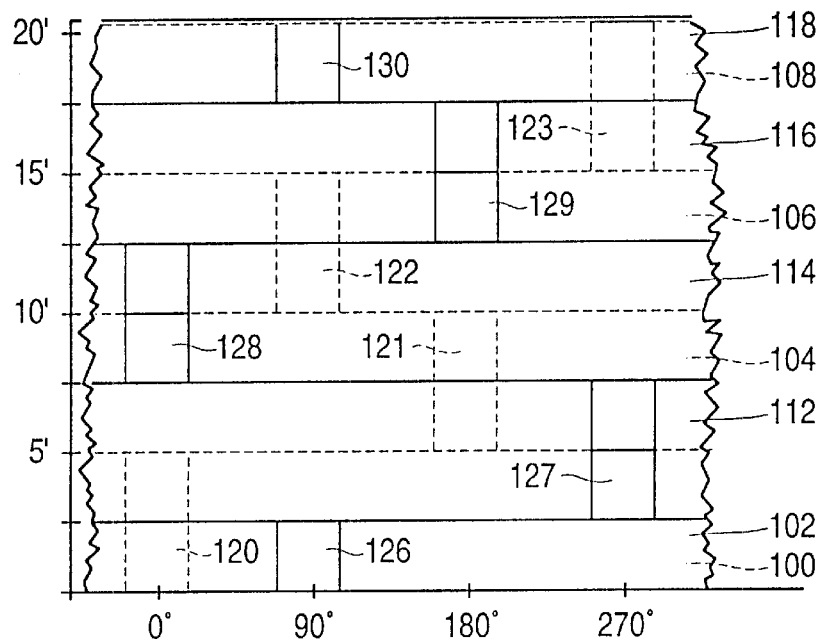
FIG. 10 is a schematic representation of layers of reinforcement members arranged around a support column.

In order to avoid a possible weak joint created with the arrangement of the jackets one on top of the other along the height of the column 84, the boundaries between adjacent jackets are staggered from layer to layer. With reference to FIGS. 8 and 10, the first jacket 100 of the first layer has a first height, for example, 5'. The first jacket 102 of the second layer has a height which is one-half the height of the first jacket 100 of the first layer, that is, 2.5 feet. The first jacket of a third layer (not shown) is 5' in height, and the first jacket of a fourth layer (not shown) is 2.5 in height. This arrangement allows for overlap of the jackets of adjacent layers and staggered joints on adjacent layers, thereby avoiding any significant weakness in the reinforcement in certain horizontal or vertical planes. The jacket 100 and additional jackets 104, 106, 108 and 110 in the first layer all abut one another at horizontal boundaries which are staggered axially with respect to horizontal boundaries between jackets 102, 112, 114, 116 and 118 in the second layer. This is accomplished by the use of the half-height jacket 102 at the bottom of the second layer. The other jackets 112, 114, 116 and 118 of the second layer are of full height. The top jacket 110 of the first layer is half height. The gaps 120–124 of the sleeves 100, 104, 106, 108, and 110, respectively, are spaced circumferentially around the column from one another and also from the gaps 126–130 of the sleeves 102, 112, 114, 116 and 118, respectively, of the second layer. In FIG. 10, the vertical axis represents the height up the column in feet, and the horizontal axis represents the position around the circumference of the column in degrees.

The jackets provide a high degree of flexibility in application, so that the needed reinforcement can be applied easily in varying amounts required in specific areas of a column, wherever needed. Thus, because of the stresses imposed at the top of the column and the bottom of the column where they contact either the supported roadway or the base are greater than in other areas of the column, additional composite column reinforcement can be placed in these locations. For example, if only a half-inch thickness of reinforcement is required at the middle of a column and an inch thickness is required at the base, then four more ⅛" layers of composite column reinforcement would be placed at the base of the column.

Figure 11:
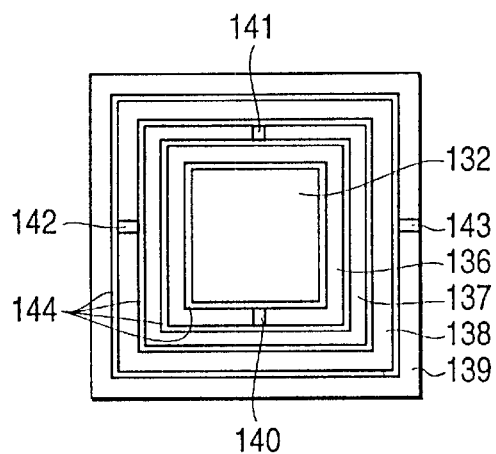
FIG. 11 is a schematic cross section through a support column reinforced by square reinforcement members according to the present invention.

Although the jackets were cylindrical in the example given above, the jackets can be formed in other shapes to have an interior surface which is complementary to a support column. For example, the jackets can be formed in a hexagon, octagon, oval and rectangle, including a square. As can be seen from FIG. 11, for a column 132 having a square cross section, composite jackets 136–139 having gaps 140–143, respectively, are square in shape to fit around the column. A layer 144 of adhesive is interposed between each two of the jackets, as well as between the jacket 136 and the column 132.

Wood utility poles are. typically 12" to 18" in diameter and 30' to 80' high. A composite reinforcing jacket according to the present invention which is made to the diameter of a utility pole is typically approximately 5' to 6' in height and approximately 12" to 18" in diameter. For a retrofitting on a utility pole in service, a hole is dug around the pole, giving approximately 6" of clearance on all sides. Dirt adhering to the pole is removed from the pole and the pole coated with the urethane or other suitable adhesive system with bacteria and micro-organism inhibitors. The jacket is opened up at the gap and slid into position around the pole. A second jacket is placed around the pole with its gap positioned 180° around the circumference of the pole from the gap of the first jacket. Third and fourth jackets can be placed around the underlying jackets, with the gap of the third jacket placed at 90° to the gap of the first jacket and the gap of the fourth jacket at 180° to the gap of the third jacket. In order to protect the pole from heat and fire, a fire-resistant ablative material of known composition, such as iron oxide, can be included in the composite reinforcement members. For example, the fire-resistant material can be mixed in with the resin in the resin bath.

The present invention can also be used in the repair of pilings on wharfs and docks due to either erosion from the sea water or from the banging of ships. The jackets of the present invention are set in place using adhesive. The urethane adhesive systems described above are activated by water and, therefore, the moisture in the piling does not affect adversely its adherence. In fact, the water could provide a tighter fit for the jacket.

The composite reinforcement members and methods described thus far are well suited to retrofit existing supports such as concrete columns, as well as to reinforce newly-constructed supports. By a further aspect of the present invention, it is possible to achieve additional saving in time and costs in the construction of new concrete columns. In this aspect of the present invention, the composite reinforcing is constructed first as an elongate form. The composite materials which can be used to construct the form are the same as the materials used in the composite reinforcement members described earlier herein. The elongate composite reinforcement member has open ends and is secured, usually in a vertical orientation, at the location where the concrete column is to be constructed. When the composite reinforcement member is secured in place, concrete is poured into the upper open end of the reinforcement member in the conventional manner for pouring concrete columns. If desired, steel reinforcing bars can be positioned inside the composite reinforcement member prior to the pouring of the concrete. When the poured concrete has cured, the composite reinforcement member, which acted as the form for pouring the concrete, is left in place to provide the reinforcement which the earlier embodiments described herein provide. As with the other embodiments, the thickness of the composite reinforcement is determined by the forces expected to be encountered.

Figure 12:
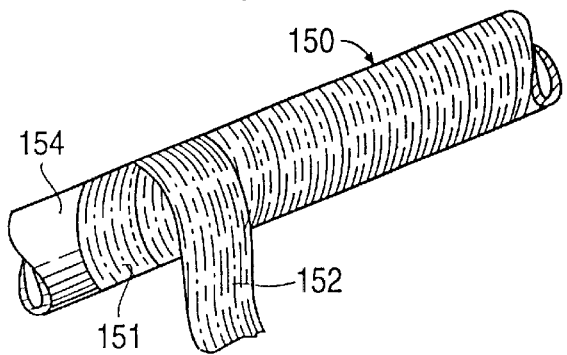
FIG. 12 is a schematic representation of the forming on a mandrel of a third embodiment of a composite reinforcing member according to the present invention.

As can be appreciated from FIG. 12, the elongate composite reinforcement member 150 can be made by feeding webs 151 and 152 of bidirectionally oriented, or tridirectionally oriented, fibers or filaments, through a resin bath to completely impregnate and embed the fibers in a matrix of the resin and then removing excess resin. The web 151 is wound helically around an elongate mandrel 154, such as a cylindrical mandrel, in a first direction, for example at a 45° angle to the longitudinal axis of the mandrel, to make a first layer having a cylindrical shape. The second web 152 is wound helically over the first web 151 in an opposite direction, for example, at a 45° angle with respect to the longitudinal axis of the mandrel 154, but on the opposite side of the longitudinal axis from the angle of the first web. Thus, one web is wound at a positive angle with respect to the axis, the next web wound at a negative angle, and so on, so that a herringbone pattern is present. In turn, the webs 151 and 152 can be attached near one end of the mandrel and the mandrel rotated as each web is fed progressively along the mandrel to form a continuous helix in which adjacent convolutions of the helix are in abutment with one another so that no spaces are left in the composite member which is being formed. Prior to wrapping the web onto the mandrel, the mandrel is sprayed with a coating of a release material so that the completed composite reinforcement member can be slipped axially from the mandrel after the reinforcement member has been formed and the resin fully cured.

The reinforcement devices of the present invention in the jacket form were tested on a series of concrete cylinders using the "Standard Test Method for Compressive Strength of Cylindrical Concrete Specimens" of the American Society for Testing and Materials, Designation: C39. Cylinders 1–4 were 6 in. in diameter and about 12 in. long, and cylinders 5–8 were 6 in., in diameter and about 9 in. long. The test cylinders were concrete cores that are ordinarily cast to test the strength of a concrete batch. Normally, the concrete cores have a compression strength of 4,000 to 6,000 psi.

The test cylinders were reinforced with 4 layers, that is, 4 jackets, of composite reinforcement. The composite reinforcement was adhered to the concrete column using an expanding urethane concrete adhesive system.

The compression tests had the following results:

| Test Specimen | Thickness of Reinforcement | Total Load (lbs) | Load/Area (psi) |
| --- | --- | --- | --- |
| Cylinder #1 | No Reinforcement | 170,500 | 6,030 |
| Cylinder #2 | .144" | 299,750 | 11,390 |
| Cylinder #3 | .184" | 332,260 | 15,420 |
| Cylinder #4 | .216" | 474,600 | 17,310 |
| Cylinder #5 | No Reinforcement | 149,500 | 5,290 |
| Cylinder #6 | .140" | 322,100 | 11,390 |
| Cylinder #7 | .180" | 435,900 | 15,420 |
| Cylinder #8 | .216" | 489,300 | 17,310 |

In addition, splitting tensile tests were done on concrete cylinders using ASTM's "Standard Test Method for Splitting Tensile Strength Concrete Specimens", Designation: C 496. This test measures the splitting tensile strength of concrete by the application of diametrical compressive force on a cylindrical concrete specimen placed with its axis horizontal between the platens of a testing machine. This test is used to evaluate the shear resistance provided by concrete. The test cylinders were reinforced in the same manner as in the compression tests.

The splitting tensile tests had the following results:

| Test Specimen | Thickness of Reinforcement | Total Load (lbs) | Load/Area (psi) |
| --- | --- | --- | --- |
| Cylinder #9 | .140" | 75,880 | 905 |
| Cylinder #10 | .180" | 100,400 | 1,210 |
| Cylinder #11 | .216" | 107,300 | 1,280 |
| Cylinder #12 | No Reinforcement | 33,750 | 405 |
| Cylinder #13 | No Reinforcement | 48,040 | 560 |

Figure 13:
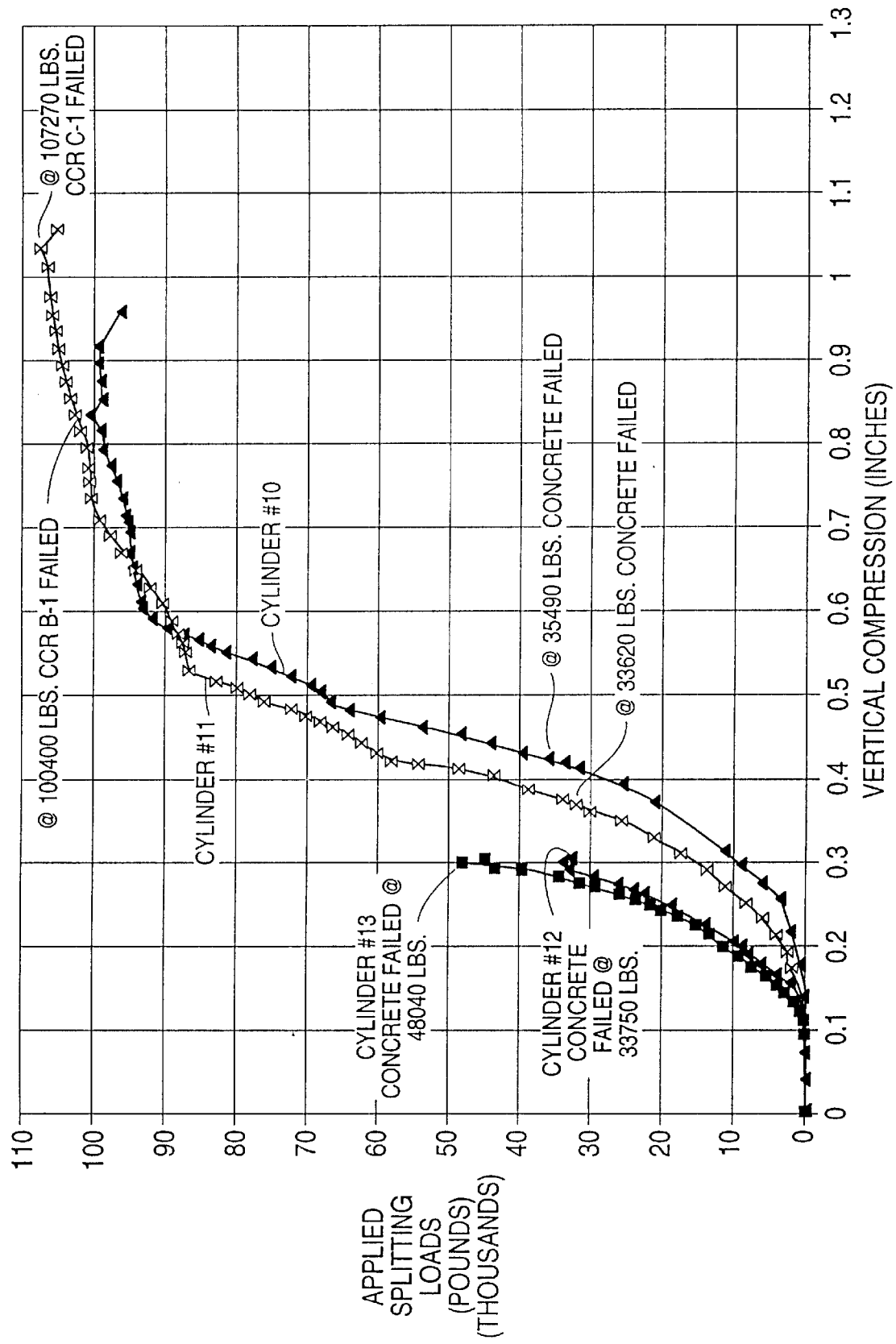
FIG. 13 is a graph of the performance in a splitting shear test of bare concrete test cylinders and concrete test cylinder reinforced with composite reinforcement members according to the present invention.

As can be seen from FIG. 13, in the splitting tensile tests of bare cylinders #12 and #13, the concrete failed at 33,750 lbs and 48,040 lbs, respectively, and the vertical compression at the point of the failure for both bare cylinders was 0.3". In the splitting tensile test of reinforced cylinder #10, the concrete failed at a splitting tensile load of 35,490 lbs., where the vertical compression was at about 0.42". However, despite the fact that the concrete, that is, the primary load-bearing member, failed, the reinforced cylinder as a whole continued to support even greater loads, up to 100,400 lbs. at a vertical compression of about 0.83 inches. Thus, despite the failure of the primary load-bearing member, the reinforced cylinder #10 as a whole withstood almost three times the amount of the force that caused the failure of the concrete. Similarly, in reinforced cylinder #11, the concrete failed at 33,620. lbs at a vertical compression of about 0.37 inches, but the cylinder failed at 107,270 lbs. at a vertical compression of about 1.03 inches.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

What is claimed is:

1. A reinforced load supporting structure comprising:
    (a) An inner load supporting structure having an exposed perimeter;
    (b) A first layer around said exposed perimeter of said load supporting structure having at least one distinct piece of preformed engineering material having high tensile strength and high modulus;
    (c) At least one additional layer around said exposed perimeter of said load supporting structure and said first layer, having at least one distinct piece of preformed engineering material having high tensile strength and high modulus wherein each piece of engineering material is joined together at at least one joint and wherein said at least one joint on at least one additional layer is not aligned with said at least one joint on said first layer; and
    (d) An adhesive substance adhering said layers of at least one distinct piece of engineering material wherein each piece of engineering material is preformed with shape complementary to the exposed perimeter of the load supporting structure.

2. The reinforced load supporting structure set forth in claim 1 wherein said pieces of engineering material are precured composites.

3. The reinforced load supporting structure set forth in claim 1 wherein said first layer of engineering material covers less than 360° of said exposed perimeter.

4. The reinforced load supporting structure set forth in claim 3 wherein said pieces of engineering material are precured composites.

5. The reinforced load supporting structure set forth in claim 1 wherein said pieces of engineering material are arc-shaped.

6. The reinforced load supporting structure set forth in claim 1 wherein said pieces of engineering material are angular-shaped.

7. The reinforced load supporting structure set forth in claim 1 wherein said first layer is adhered to said exposed perimeter of said inner load supporting structure.

8. The reinforced load supporting structure set forth in claim 1 wherein each layer contains at least two pieces of engineering material.

9. The reinforced load supporting structure set forth in claim 1 wherein a distinct first preformed piece of engineering material is part of said first layer and a plurality of preformed pieces of engineering material are in succession first adjacent to said first piece of engineering material and then adjacent to each succeeding piece of engineering material around said structure and around said first and succeeding pieces of engineering material.

10. The reinforced load supporting structure set forth in claim 9 therein said pieces of engineering material form at least two layers and each piece of engineering material is joined together with each succeeding piece of engineering material at a joint and wherein each joint on at least one additional layer is not aligned with each joint on said first layer.

11. The reinforced supporting structure set forth in claim 10 wherein each piece of engineering material covers less than 360° of said exposed perimeter.

12. A process for reinforcing a load supporting structure around its exposed perimeter with a pre-cured composite shell comprising:
   (a) placing a first layer of at least one distinct precured composite piece around said exposed perimeter of said load supporting structure;
   (b) applying an adhesive substance between said piece and said structure; and
   (c) exerting pressure on said shell until the adhesive cures wherein each pre-cured composite piece is preformed with a shape complementary to the exposed perimeter of the load supporting structure, (d) placing a least one additional layer of at least one distinct pre-cured composite piece around the exposed perimeter of said load supporting structure and first layer of at least one precured composite piece and applying an adhesive substance between said layers.

13. The process of claim 12 wherein said at least one composite piece within the same layer is joined together at at least one joint and wherein said at least one joint on at least one additional layer is not aligned with said at least one joint on said first layer.

14. The process of claim 13 wherein each layer contains at least two composite pieces.

15. The process of claim 13 wherein each composite piece covers less than 360° of said exposed perimeter.

16. The process of claim 13 wherein each layer of at least one composite piece covers less than 360° of said exposed perimeter.

17. The process of claim 13 wherein said composite pieces are arc-shaped.

18. The process of claim 13 wherein said composite pieces are angular-shaped.

19. The process of claim 13 wherein said adhesive substance is applied to each piece prior to placing said piece around the perimeter of said structure.

20. The process of claim 12 wherein said first layer of at least one composite piece covers less than 360° of said exposed perimeter.

21. The process of claim 12 wherein at least two distinct pre-cured composite pieces of said first layer are placed over a first portion and at least one adjoining portion of said exposed perimeter over the length of said load supporting structure.

22. The process of claim 12 wherein a distinct first precured composite piece is placed as part of said first layer around said exposed perimeter of said load supporting structure and further comprising placing a plurality of pre-cured composite pieces in succession first adjacent to said first composite piece and then adjacent to each succeeding composite piece around said structure and said first and succeeding composite pieces, and wherein said composite pieces form at least two layers and each composite piece is joined together with each succeeding composite piece at a joint and wherein each joint on at least one additional layer is not aligned with each joint on said first layer.

23. The process of claim 22 wherein each composite piece covers less than 360° of said exposed perimeter.

24. A process for reinforcing a load supporting structure around its exposed perimeter comprising:
   (a) placing a first layer of at least one distinct piece of preformed engineering material having high tensile strength and high modulus around said exposed perimeter of said load supporting structure;
   (b) placing at least one additional layer of at least one distinct piece of preformed engineering material having high tensile strength and high modulus around said exposed perimeter of said load supporting structure and said first layer, wherein said at least one piece of engineering material is joined together at at least one joint and wherein said at least one joint on at least one additional layer is not aligned with said at least one joint on said first layer;
   (c) applying an adhesive substance between said layers of at least one distinct piece of engineering material; and
   (d) curing said adhesive wherein each piece of engineering material is preformed with shape complementary to the exposed perimeter of the load supporting structure.

25. The process set forth in claim 24 wherein said engineering material is a pre-cured composite and said curing means comprises exerting pressure on said layers until the adhesive cures.

26. A method of reinforcing a cylindrical support column, comprising:
   preforming a plurality of reinforcing members each comprising a sleeve terminating in lateral edges next to each other, said sleeve defining a discontinuity at the lateral edges, said sleeve having a plurality of first high tensile strength filaments extending parallel to one another, and a plurality of second high tensile strength filaments extending parallel to one another at a 90° angle to the first filaments, wherein the first and second filaments are embedded in a matrix of a fully cured resin,
   wherein the step of preforming comprises forming at least some of the sleeves to have an inner diameter substantially equal to the diameter of the cylindrical support column,
   wherein the step of preforming comprises preforming said sleeve to have the first high tensile strength filaments comprise approximately 90% of all of the high tensile strength filaments of the sleeve and extend parallel to the lateral edges of the sleeve and the second high tensile strength filaments to comprise approximately 10% of all of the filaments of the sleeve;
   wrapping the sleeves around the cylindrical support column from one end of the cylindrical support column to the other such that the sleeves cover substantially the entire cylindrical support column; and
   fixing the sleeves to the cylindrical support column with adhesive.

\* \* \* \* \*